June 2, 1931. S. L. COOPER 1,808,402
FERN STAND
Filed May 15, 1930 2 Sheets-Sheet 1

Inventor
S. L. Cooper
By Clarence A. O'Brien
Attorney

June 2, 1931. S. L. COOPER 1,808,402
FERN STAND
Filed May 15, 1930 2 Sheets-Sheet 2

Inventor
S. L. Cooper
By Clarence A. O'Brien
Attorney

Patented June 2, 1931

1,808,402

UNITED STATES PATENT OFFICE

SELEANA L. COOPER, OF CHARLOTTESVILLE, VIRGINIA

FERN STAND

Application filed May 15, 1930. Serial No. 452,694.

The present invention relates to a cabinet fern stand and has for its prime object to provide a stand for ferns whereby plenty of water may be given to the plant and means is provided for inspecting the drainage.

Another very important object of the invention resides in the provision of a stand of this nature in the form of a cabinet and the provision of a removable pan in the cabinet for catching the water which drains from the plant.

A still further very important object of the invention resides in the provision of an apparatus of this nature which is simple in its construction, inexpensive to manufacture, attractive in appearance, easy to handle, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
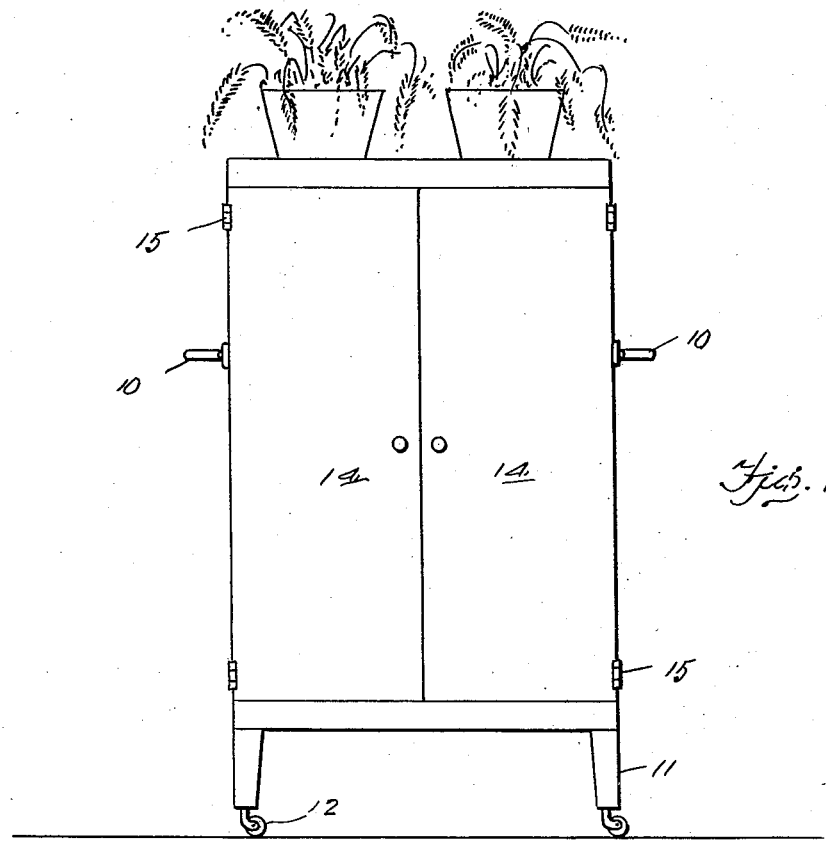
Figure 1 is a front elevation of the apparatus embodying the features of my invention.
Figure 2:
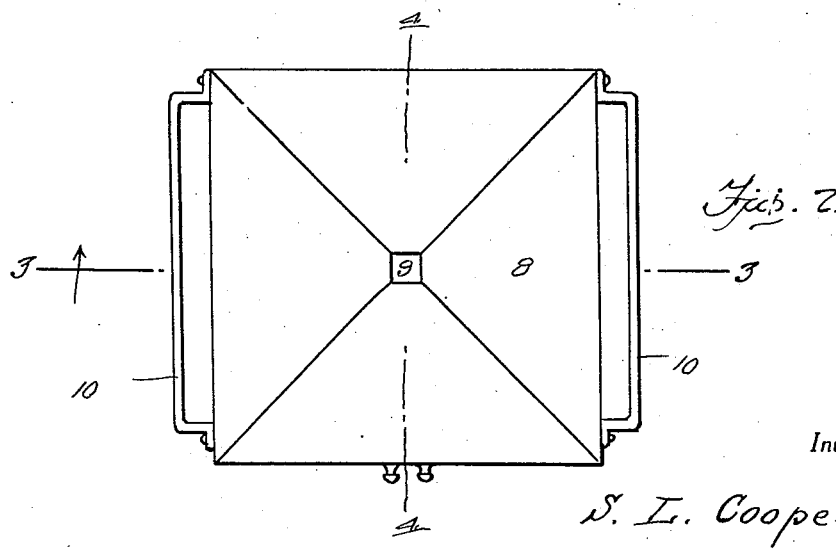
Figure 2 is a top plan view thereof.
Figure 3:
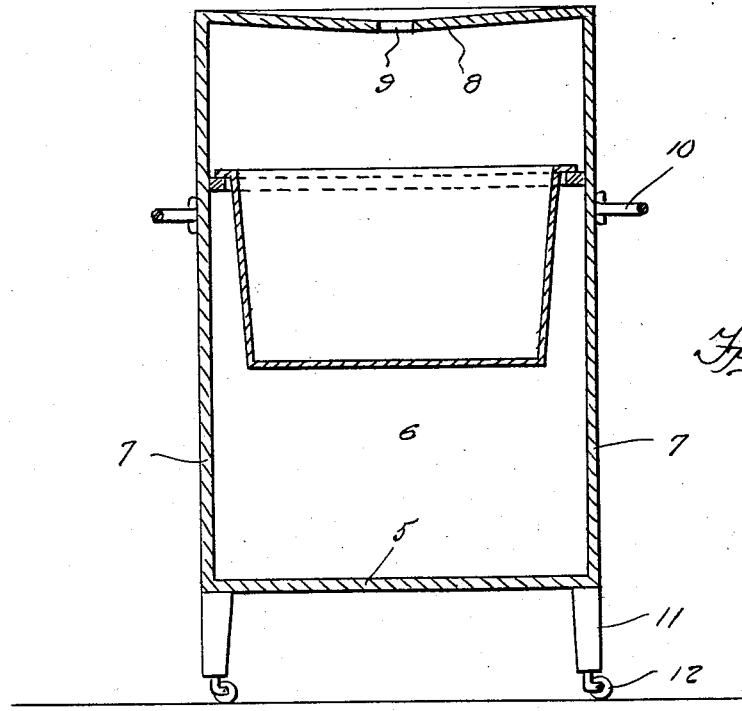
Figure 3 is a vertical section taken substantially on the line 3—3 of Figure 2.
Figure 4:
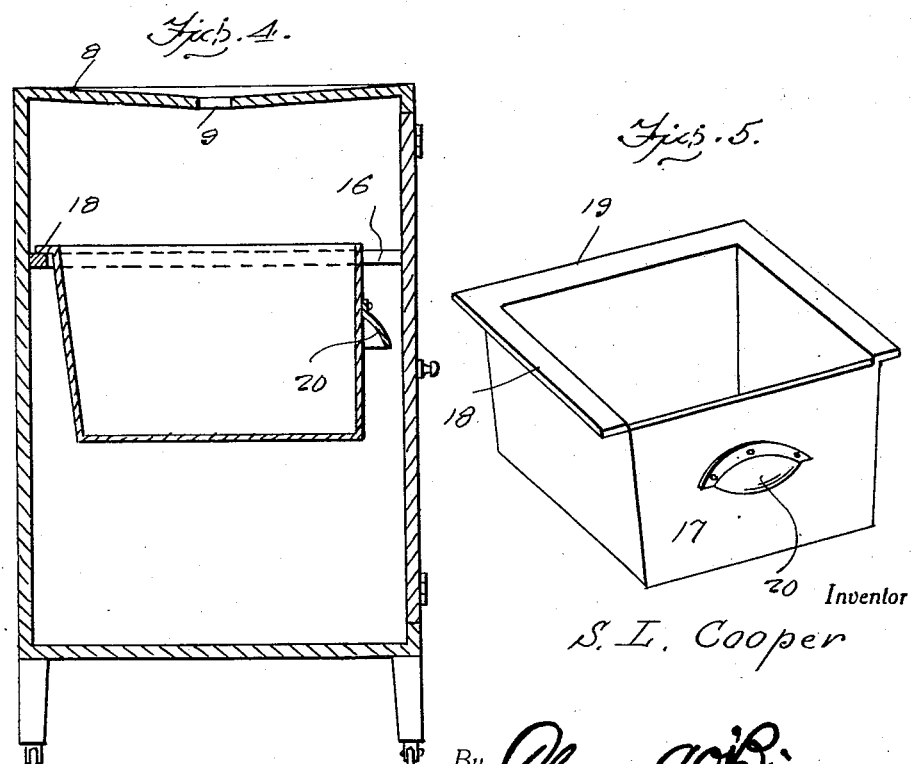
Figure 4 is a vertical section taken substantially on the line 4—4 of Figure 2.
Figure 5:
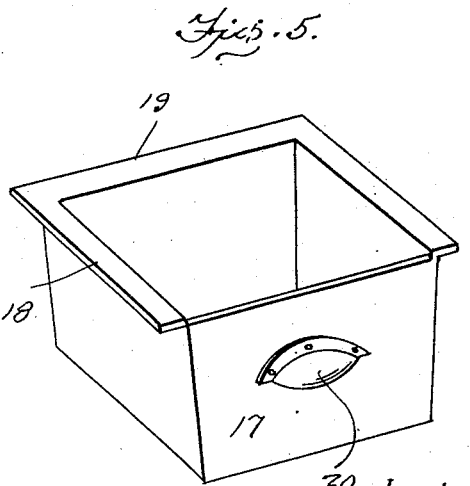
Figure 5 is a perspective view of the drain tank.

Referring to the drawings in detail it will be seen that the cabinet comprises a bottom 5 with a rear wall 6 and side walls 7, 7 rising therefrom. A top 8 is disposed across the walls 6 and 7 and this top inclines downwardly from its side toward its center and in the center is provided with a drain opening 9. On the outside of the side walls 7 are elongated horizontal handles 10. Legs 11 depend from the bottom 5 and are mounted on casters 12.

Doors 14 are hingedly connected as at 15 to the sides 7 to close the front of the cabinet. Inside the cabinet on the walls thereof are ribs 16. A drain pan 17 has side flanges 18 and a rear flange 19 to rest and slide on the flanges 16 as the pan is being moved in and out of the cabinet. A handle, of course, is provided in front of the drain pan as shown at 20 so that it may be easily drawn out of the cabinet when desired.

The ferns in pots and the like are placed on the top 8 as is indicated to advantage in Figure 1 and as much water as needed may be poured into the pots and the drainage will be taken care of by the water passing through the opening 9 and collecting in the drain tank. In this way it is possible to have a cabinet support which may be formed into an attractive piece of furniture and may be moved about easily which enables ferns to be maintained in proper condition in the house.

The water is taken care of in an easy manner. It is thought that the construction, utility and advantages will now be quite apparent to those skilled in this art without a more detailed description thereof.

The present embodiment of the invention has been disclosed in considerable detail merely for the purpose of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

A device of the class described comprising a cabinet, hinge doors for the cabinet, ribs in the cabinet, a drain pan having flanges restable on said ribs, the top of the cabinet having an opening, said top of the cabinet inclining downwardly and inwardly toward its center and the opening being formed in said center.

In testimony whereof I affix my signature.

SELEANA L. COOPER.